United States Patent [19]

Musto et al.

[11] Patent Number: 5,007,675

[45] Date of Patent: Apr. 16, 1991

[54] FORE-AND-AFT ADJUSTER FOR BICYCLE SEAT

[76] Inventors: Mario S. Musto, 60 Roan Pl., Woodside; Scott W. Davis, 314 Palomar Dr., Redwood City, both of Calif. 94062

[21] Appl. No.: 507,000

[22] Filed: Apr. 10, 1990

Related U.S. Application Data

[63] Continuation-in-part of Ser. No. 379,597, Jul. 14, 1989, abandoned.

[51] Int. Cl.⁵ .............................................. B62J 1/00
[52] U.S. Cl. .................................... 297/195; 297/311
[58] Field of Search ............... 297/195, 196, 203, 207, 297/215, 205, 311

[56] References Cited

U.S. PATENT DOCUMENTS

| | | | |
|---|---|---|---|
| 460,784 | 10/1891 | Mercer | 297/196 |
| 572,273 | 12/1896 | Peterson | 297/195 |
| 1,205,828 | 11/1916 | Whaley | 297/196 X |
| 4,772,069 | 9/1988 | Szymski | 297/195 |

FOREIGN PATENT DOCUMENTS

| | | | |
|---|---|---|---|
| 209202 | 10/1959 | Austria | 297/195 |
| 328506 | 8/1903 | France | 297/195 |
| 2509 | 4/1904 | France . | |
| 470887 | 6/1914 | France | 297/195 |
| 22323 | 6/1921 | France | 297/195 |
| 819647 | 7/1937 | France | 297/195 |
| 984739 | 2/1951 | France | 297/195 |
| 1281423 | 12/1961 | France . | |
| 112190 | 1/1918 | United Kingdom | 297/195 |
| 114997 | 4/1918 | United Kingdom | 297/195 |
| 915594 | 1/1963 | United Kingdom | 297/196 |
| 2116128 | 9/1983 | United Kingdom | 297/195 |

*Primary Examiner*—Jose V. Chen
*Attorney, Agent, or Firm*—David Pressman

[57] ABSTRACT

A bicycle seat which can be adjusted by the rider while riding within a range of fore-and-aft positions comprises a pair of telescoping tubes (20, 16) with the outer tube attached to the bicycle's frame (18) and the inner tube connected to the seat via a member (46) which extends through a slot (64) in the outer tube. A bungee cord (26) is connected between the seat and the front end of the outer tube so as constantly to pull the seat and the inner tube forward. The inner tube has a series of holes (60A to 60E) connected by a groove (62) and a detent cylinder (58) has a spring-loaded detent plunger (54) which extends into one of the holes to lock the inner cylinder in position. The plunger is connected to an operating lever (50) by a cable (52) so that the rider can withdraw the plunger from a hole to move the seat forward or backward.

22 Claims, 8 Drawing Sheets

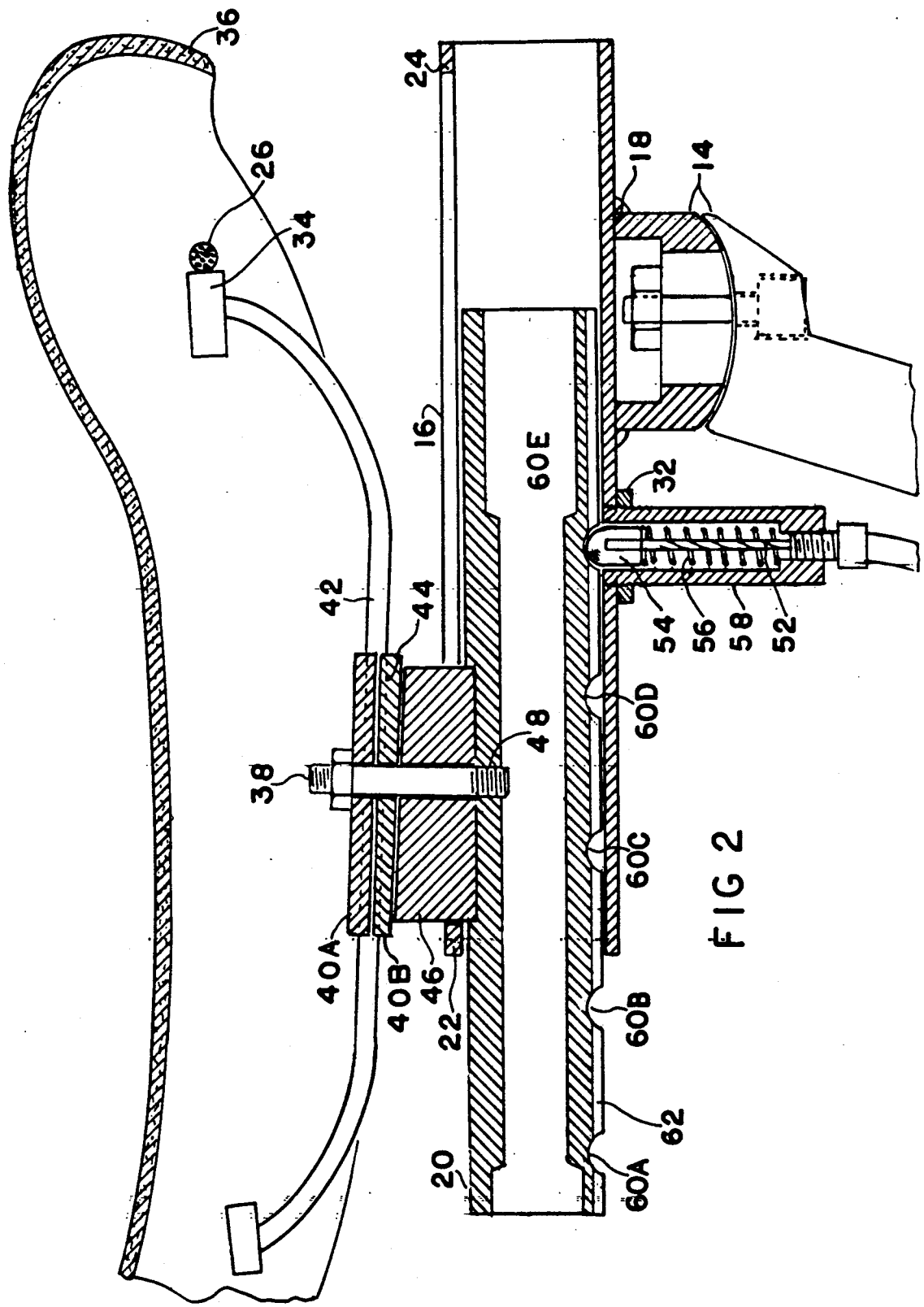

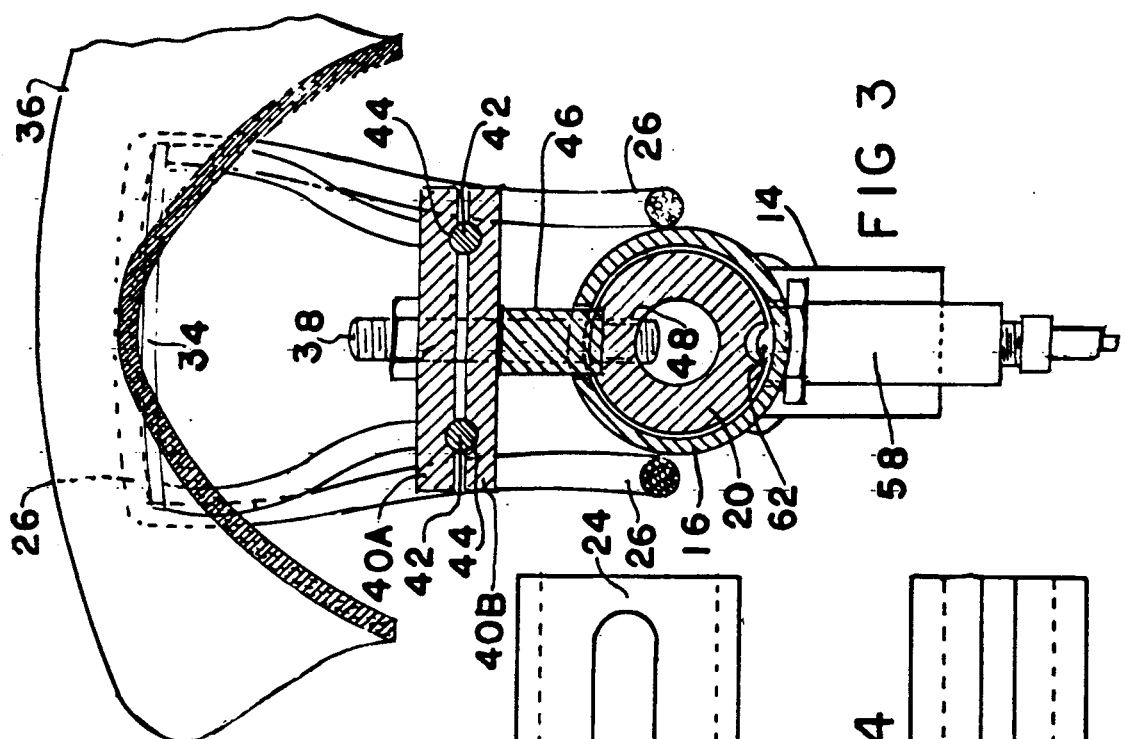
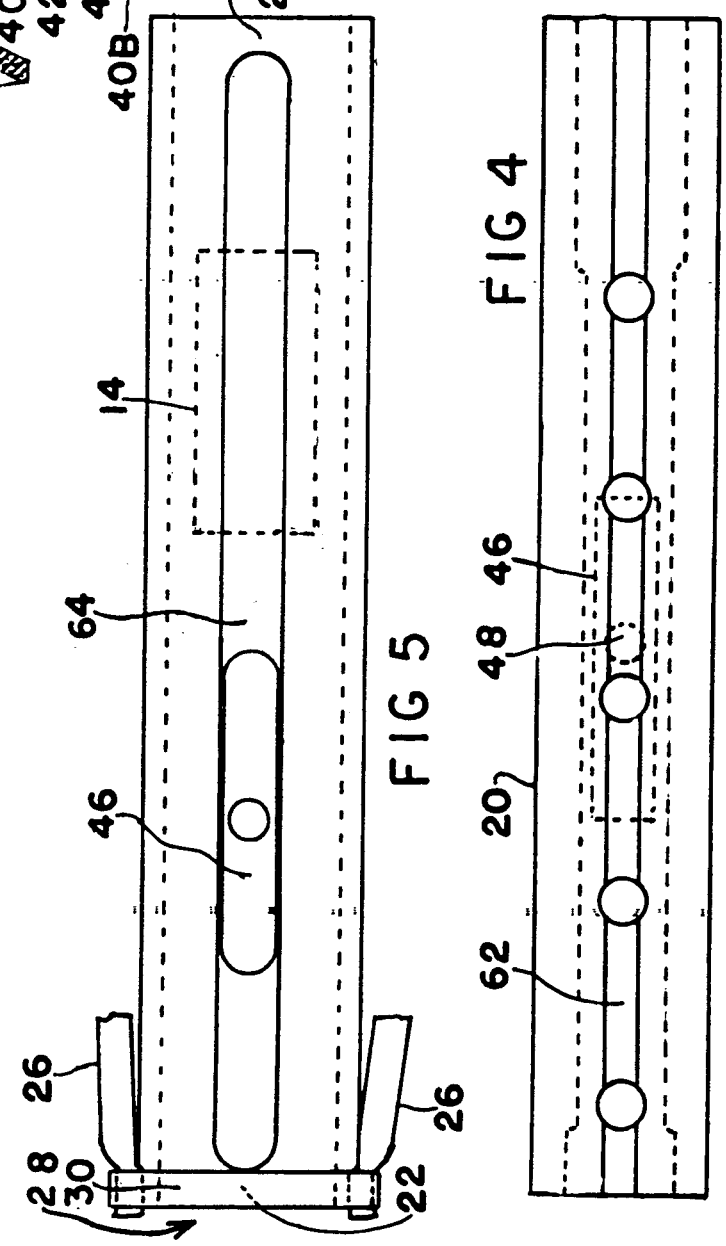

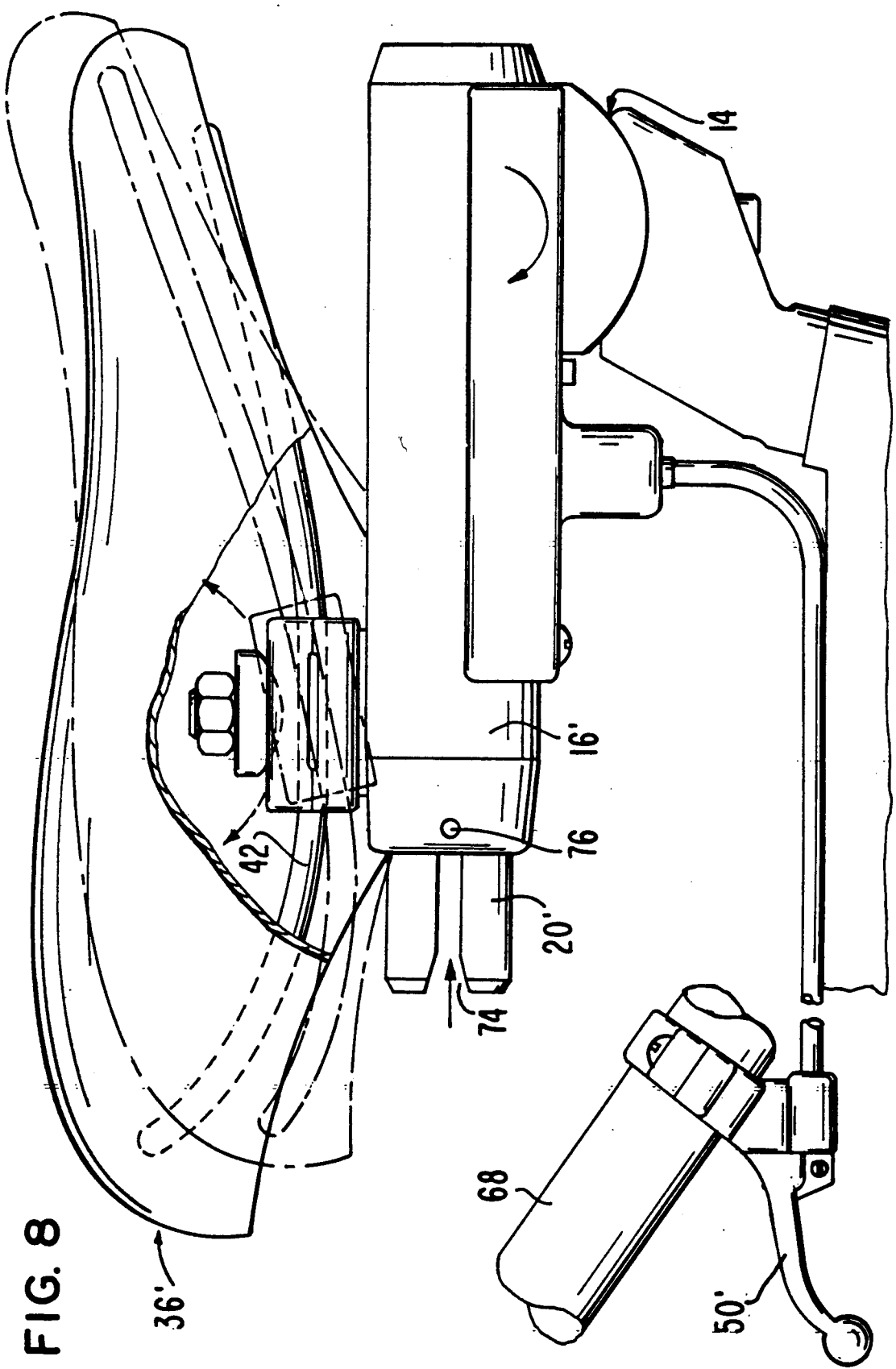

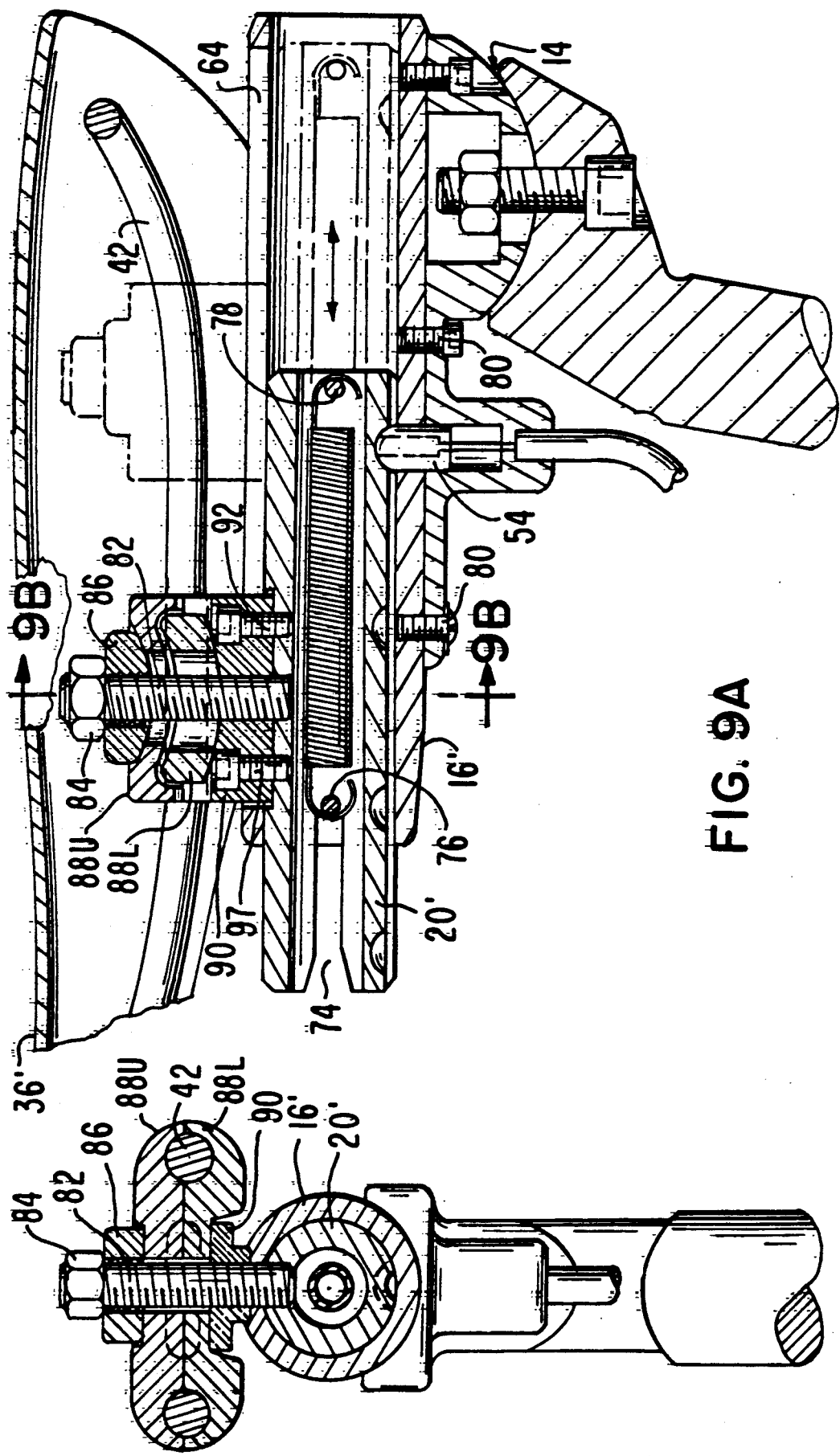

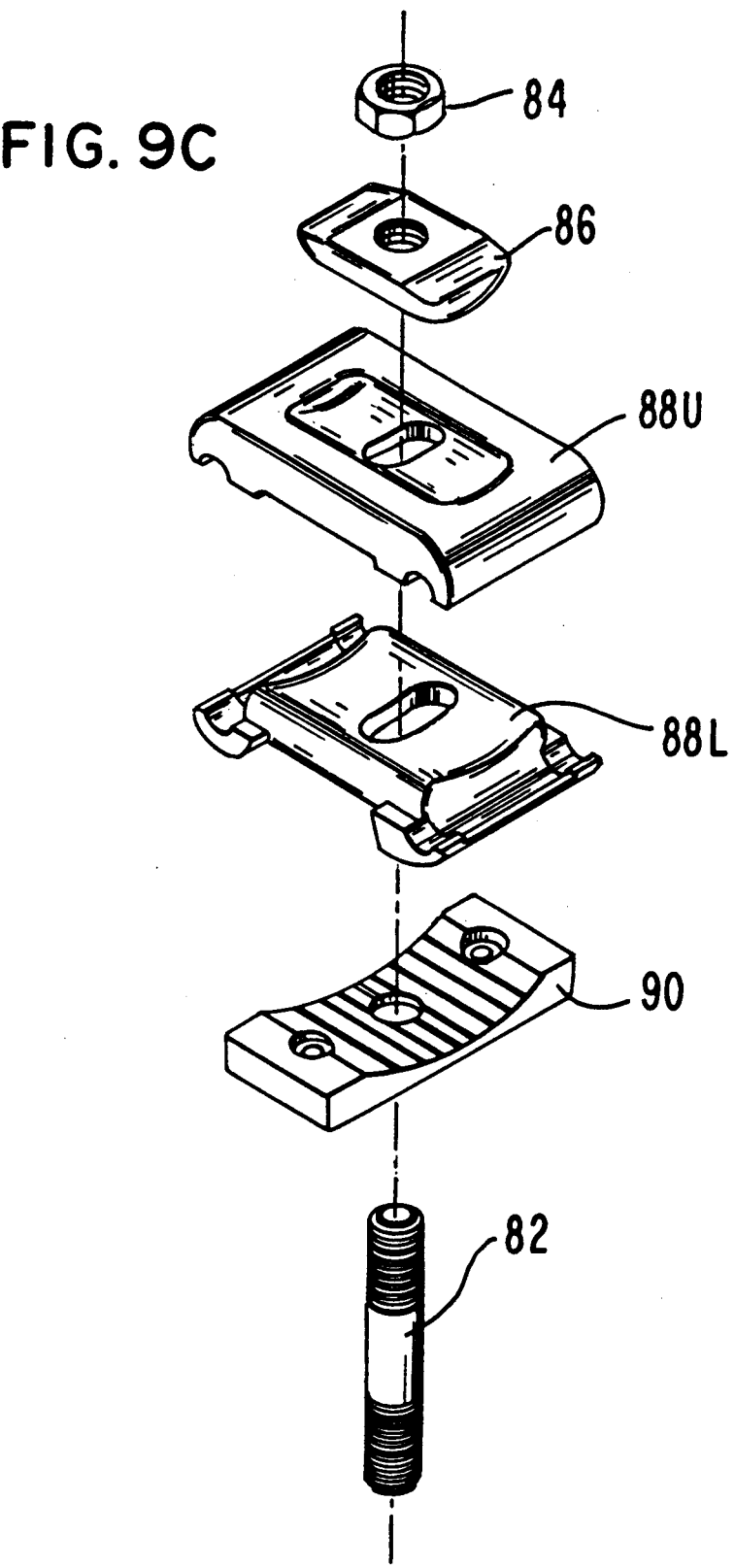

FORE-AND-AFT ADJUSTER FOR BICYCLE SEAT

CROSS REFERENCE TO RELATED APPLICATION

This application is a continuation-in-part of Application Ser. No. 07/379,597, filed Jul. 14, 1989, now abandoned.

BACKGROUND

1. Field of Invention

This invention relates generally to bicycles, specifically to bicycles seats and an adjustment mechanism therefor.

Description of Art

Heretofore, bicycle seats were made vertically adjustable in height in order to accommodate riders of various heights. However, while such height adjustability made riding a bike far more comfortable for riders of varying heights, we have found that the degree of comfort for such riders was not optimal because the distance from the seat to the handlebars of the bike still remained fixed. Since this distance was designed as a compromise posItion to accomodate riders of average or medium arm length, very tall riders or riders who otherwise had very long arms found this distance too short for optimum comfort. That is, their arms were unduly bent, or they had to lean back to a less-than-optimal position when holding the bars. Similarly, riders with shorter-than-average arms often had to lean forward or stretch their arms by an uncomfortable amount.

Attempts have been made in the past to provide fore-and-aft adjustment of bicycle seats, but these have not become popular as any adjustment required the rider to stop, dismount, operate levers, make adjustments, lock them in, then remount and start off again.

In addition, the fixed fore-and-aft position of the seat often created a less-than-optimal relationship between the seat and the foot pedals of the bicycle. We have found that, in order for riders to put out maximum power when pedaling, and also to pedal with maximum efficiency, the fore-and-aft position of the seat in particular needs to be adjustable with respect to the pedals while the rider is actually pedaling and must be optimized for each rider. This relationship is especially important in competitive bicycling events, such as the race known as the Triathalon, where pedaling efficiency over long distances must be optimized in order to have a competitive advantage. We have found that the seat's fixed fore-and-aft position with respect to the pedals changes from level to ascending or descending conditions or combating headwinds. This causes riders with longer or shorter legs than the average to suffer competitive disadvantages due to muscle fatigue.

In addition, we have found that the fixed fore-and-aft position of the seat created undue fatigue for long-distance riders. This is because their legs and arms worked in the same position for several hours, causing the same muscle groups to work continuously and thus fatigue more than if their seat positions could be changed occasionally, especially while pedaling, so that alternative muscle groups could be used.

Furthermore, when a bicycle is pedaled uphill, or against a headwind, one set of muscles can be relaxed by instant changes in the seat's position, either forward or rearward as desired by individual rider preference, thereby increasing efficiency to cope with the added workload.

We have found that fore-and-aft (F&A) seat adjusters can substantially relieve the foregoing problems, but there is another problem associated with bicycle riding which heretofore has not been addressed or relieved by existing fore-and-aft adjusters. That is the problem of obtaining an optimum leg extension when pedaling. It is known that for optimum power, reduction of fatigue, and overally efficiency, each of a rider's legs should be extended to an almost straight orientation, i.e., such that the rider's knee angle is about 160°, —when the corresponding pedal is at its lowest position. With existing F&A adjusters, when the seat is in one position, say maximum rearward, the seat height can be adjusted so that the rider's leg extension is optimized, but when the seat is moved to its opposite position, say maximum forward (or vice-versa), the rider's knee angle will be less than optimum, e.g., only about 110°. This will reduce pedaling power, increase fatigue, and reduce overall efficiency when the rider is in this position.

OBJECTS AND ADVANTAGES

Accordingly, several objects and advantages of the invention are to provide a bicycle seat assembly which is more comfortable, which has an adjustable fore-and-aft position, or adjustable distance from the seat to the handlebars, which offers maximum comfort for very long or very short arms, which can be adjusted to an optimal position with respect to the foot pedals of the bicycle for riders of varying heights, which can enable riders of varying heights to put out maximum power when pedaling, which will enable a rider to have an optimum leg extension position or knee angle when the corresponding pedal is down, regardless of the seat position, and which will enable the rider to pedal with maximum efficiency on both level and inclined surfaces, especially in competitive bicycling events and over long distances, and which reduces fatigue for long-distance riders by enabling alternative muscle groups to be worked. Further objects and advantages are to provide a bicycle in which the above adjustments can be made instantly while the rider is pedaling and in which the adjustment can be securely locked in the newly adjusted position without stopping.

Still further objects and advantages will become apparent from a consideration of the ensuing description and the accompanying drawings.

BRIEF DESCRIPTION OF DRAWINGS

FIG. 2 is a sectional view of the adjuster of FIG. 1.

FIG. 3 is a sectional view along the line 3—3 of FIG. 1.

FIG. 4 is a bottom view of an inner member of the adjuster of FIG. 1.

FIG. 5 is a top view of the outer member.

FIG. 8 is a side view of a seat assembly as used in the embodiments of FIGS. 7A and 7B.

FIG. 9A is a side sectional view of the seat assembly of FIG. 8, FIG. 9B is a sectional rear-facing view taken along the plane indicated by the line 9B—9B of FIG. 9A, and FIG. 9C is an exploded view of the components of the seat adjuster of FIGS. 9A and 9B.

Figure 1:
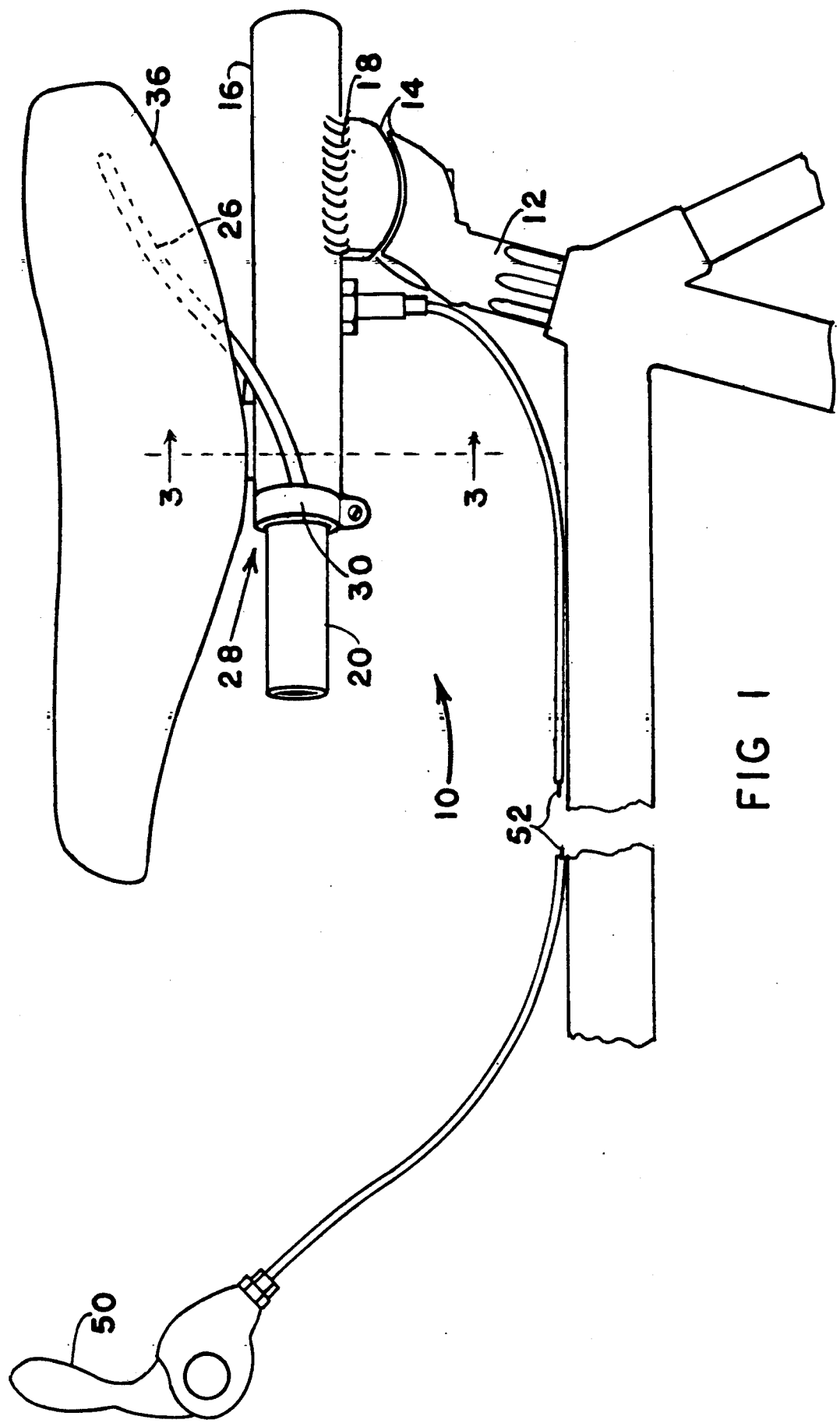
FIG. 1 is a perspective view of the fore-and-aft adjuster of the present invention.

DRAWING REFERENCE NUMERALS 10 seat adjuster
12 seat post
14 level adjuster
16 outer member
18 top edge
20 inner member
22 forward slot end
24 rearward slot end
26 elastic (bungee) cord
28 front end
30 clamp
32 lock nut
34 seat mounting member
36 seat
38 bolt
40A and 40B seat mounting plates
42 seat spring
44 grooves
46 slide member
48 threaded hole
50 lever
52 cable
54 plunger
56 compression spring
58 detent housing
60 A,B,C,D,E drilled holes
62 semi-circular groove
64 slot
66 rider
68 bicycle
70 left pedal
72 left leg
74 slot
76 transverse pin in 16'
78 transverse pin in 20'
80 bolts
82 threaded stud
84 nut
86 mounting plate block
88 (U&L) seat mounting plates
90 saddle
92 bolts

SUMMARY

In accordance with the present invention, a bicycle seat adjuster for adjusting a bicycle seat in a fore-and-aft direction comprises a pair of telescoping tubes with the seat attached to the inner tube via a slot in the outer tube and the outer tube attached to the seat post of the bicycle frame. A bungee cord pulls the inner tube forward and a locking mechanism comprising a series of holes in the inner tube and a mating plunger attached to the outer tube is arranged to lock the tubes in any of a plurality of positions.

DETAILED DESCRIPTION FIGS. 1–4

FIG. 1 shows a seat adjuster 10 according to the invention. Adjuster 10 is mounted on a standard seat post 12 and level adjuster 14. The height of adjuster 10 can be changed by raising or lowering post 12, and the angle of adjuster 10 can be changed by adjusting level adjustor 14. Adjuster 10 comprises a tubular outer member 16 which is welded to the top surface 18 of adjuster 14. A tubular inner sliding member 20 is telescopingly positioned inside outer member 16. Forward and rearward travel of inner sliding member 20 is limited by the length of a slot 64 (FIG. 5) in outer member 16. A connector slide member 46 (FIGS. 3 and 5) operates in slot 64 and joins inner sliding member 20 to seat 36 with the aid of a bolt 38. Forward travel is terminated by connector slide member 46 coming into contact with slot end 22 and rearward travel is limited by slot end 24.

Inner member 20 is pulled forward by a prestretched elastic bungee cord 26 which is attached to front end 28 of outer member 16 by a clamp 30 (FIGS. 1 & 5). Cord 26 is pre-stretched around the back portion of a seat mounting member 34 (FIGS. 2 & 3) or any other suitable place in the rear of the underside of seat 36. The purpose of cord 26 is to urge in a forward direction seat 36 and hence inner member 20 to which it is attached by a mounting bolt 38. The bungee cord also aids in stabilizing the position of the seat, i.e., preventing it from "floating" or moving in an uncontrolled fashion, when the seat is being moved from position to position.

Two mounting plates 40A and 40B (FIGS. 2 & 3) sandwich two seat spring bars 42. Plates 40A and 40B contain grooves 44 to hold bars 42. Mounting bolt 38 passes through the plates and an underlying slide member 46. The bottom end of bolt 38 screws into threaded hole 48 of inner member 20, and its top end is screwed into a nut which is positioned over top plate 40A.

Inner member 20 can be selectively adjusted into any one of five positions, spaced at about 28 mm (1⅛ in) apart, thereby enabling seat 36 to be adjusted in discrete steps along a total range of 115 m (4⅛ in). This is accomplished by a cable-operated detent system, in which a handlebar lever 50 (FIG. 1) can be activated, whereby an attached cable 52 (FIGS. 1 & 2) pulls a detent plunger or pawl 54 down against a compression spring 56.

Plunger 54 and spring 56 are mounted within a detent housing 58. Detent housing 58 is screwed into the lower side of outer member 16 and locked by a nut 32. When plunger 54 is pulled down it will be disengaged from whichever one of five holes, 60A, 60B, 60C, 60D, and 60E, It is mated or engaged with. Holes 60A to 60E are drilled in the bottom of inner member 20 and are coplanar with a semicircular groove 62 which links all holes together.

Operating lever 50 is connected to plunger 54 via a flexible cable 52 so that a rider (not shown) sitting on seat 36 can operate the lever to release plunger 54 from one of holes 60. The rider can then push the seat backwards with his or her arms or alternatively lift up enough to allow bungee cord 26 to pull the seat forward to the desired position. Thereafter the rider releases lever 50 (FIG. 1) in the opposite direction, allowing compression spring 56 (FIG. 2) to return plunger 54 into a different one of the holes 60A to 60E. Lever 50 is urged to a "home" position by force from cable 52 which is in turn urged by spring 56.

Seat 36 now has a new horizontal location in relation to the pedals. Groove 62 provides a channel guide and bearing surface for the nose of plunger 54 when plunger 54 is not engaged in any of holes 60A to 60E, but is being moved from one hole to another.

FIG. 5 shows a top view of outer member 16. Its slot 64 is occupied by slide member 46. Slide member 46 travels as far as slot end 22 in a forward direction and to slot end 24 in a rearward direction. Thus, slide member 46 supports seat 36 in a upright position and acts as a guide when the seat 36 is being repositioned. It also prevents inner member 20 from rotating within outer member 16.

OPERATION FIGS. 1-5

In practice, to move the seat backward from (for example) hole 60E (FIG. 2) to a new location (for example, hole 60D), the rider activates handle bar lever 50. This disengages plunger 54 from hole 60E. The rider now pushes back on seat 36 sufficiently to move hole 60E out of alignment with plunger 54. The rider then releases lever 50 so as to allow compression spring 56 to push plunger 54 upward as far as it will go. Plunger 54 thereupon extends into semi-circular groove. 62 in inner member 20, as is clearly shown in FIGS. 2, 3 & 4. The rider's continued rearward movement of seat 36 against bungee cord 32 will eventually cause hole 60D to come into alignment with plunger 54, whereupon spring 56 will force plunger 54 into engagement with new hole 60D, locking the seat in that new position until further repositioning of the seat is desired. During such rearward movement, plunger 54 rides in groove 62.

To move the seat forward, the rider activates lever 50, allowing bungee cord to pull seat 36 forward. This will pull hole 60D out of alignment with plunger 54. The rider then releases lever 50 so as to allow spring 56 to push plunger 54 into grove 62. Then the bungee cord pulls seat 36 forward until plunger automatically locks into drilled hole 60E.

Suppose the rider wishes to move all the way forward so that plunger 54 will go from hole 60A to hole 60E. The rider activates lever 50 so as to disengage plunger 54 from their locked hole 60A. This frees the tubes from engagement. The rider then allows the bungee cord to pull seat 36 all the way forward. The rider then releases lever 50 so as to allow spring 56 to push plunger 54 into hole 60E.

DESCRIPTION AND OPERATION FIGS. 6-9

A further refinement of the invention is illustrated in FIGS. 6 to 9.

Figure 6A:
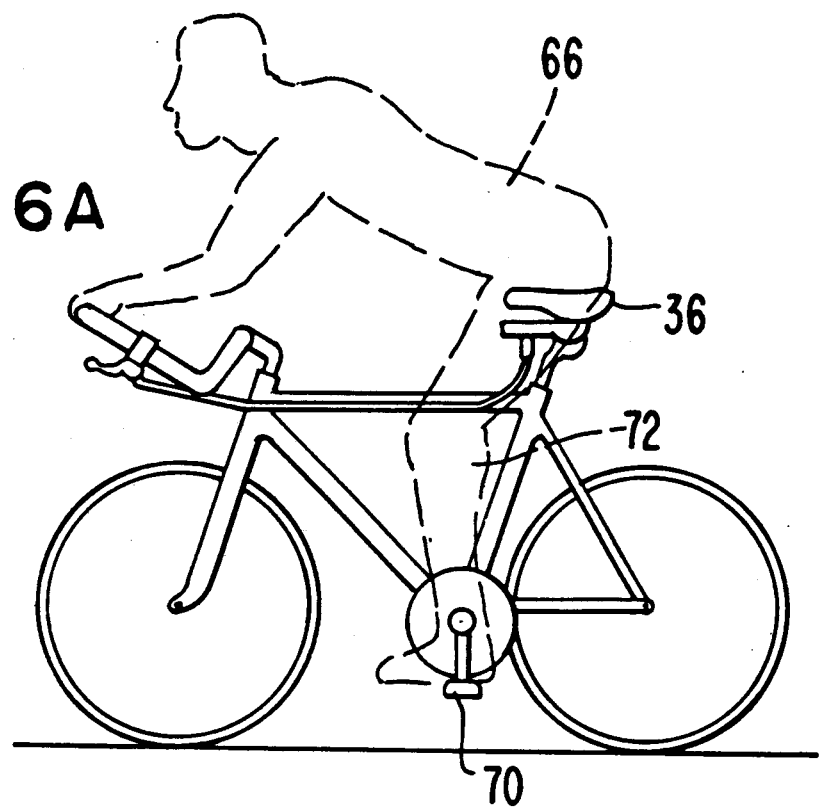
FIG. 6A is a diagram of a rider on a bicycle with the fore-and-aft (F&A) adjuster and with the seat back.

First consider FIG. 6A, which shows a rider 66 on a bicycle 68 which has the fore-and-aft (F&A) adjuster of FIGS. 1-5 installed and wherein the F&A is arranged so that the seat is at its maximum back or rearward position. Note that the rider is to the rear of the pedals, left pedal 70 is down, and the rider is sufficiently far from the pedals that his left leg is almost fully extended or straight, i.e., his knee angle is about 160°. This is the correct or optimum extension for riding since it is known that with this extension, the rider will put out optimum power, suffer minimal fatigue, and obtain overall efficiency. The height of seat 36 is adjusted to achieve this extension.

Figure 6B:
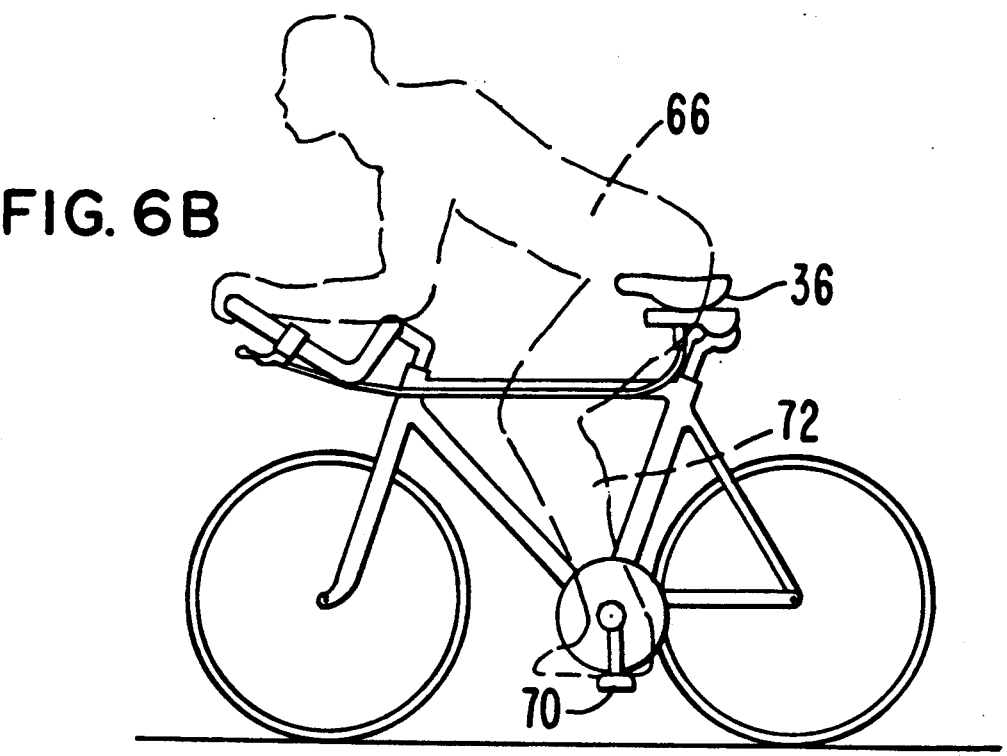
FIG. 6B is a diagram similar to FIG. 6A, but with the seat forward.

FIG. 6B is a diagram similar to FIG. 6A, but the seat has been moved forward for a change of position. Note that the rider is more directly over and hence closer to the pedals. As a result his left knee angle is about 110°. This is less than optimum. In this position the rider will tend to put out less power, suffer more fatigue, and lose overall efficiency. This lack of adequate leg extension could be alleviated by raising the seat, but this would be awkward and time consuming and thus impracticable in an actual riding or competitive situation.

Note that in FIGS. 6A and 6B the seat is slightly tilted forward, as is customary for performance riding. The seat has the same tilt in both figures.

Figure 7A:
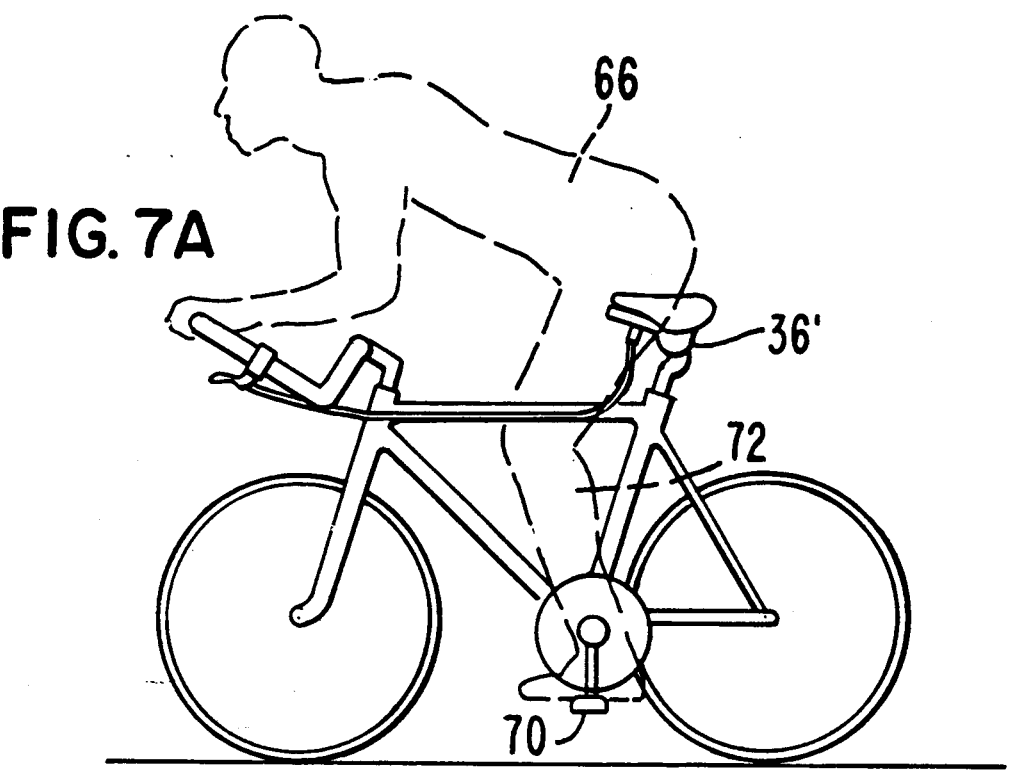
FIG. 7A is a diagram similar to FIG. 6A, but wherein the seat also tilts with respect to the F&A adjuster according to another embodiment.

FIGS. 7A is a diagram similar to FIG. 6A, but here the F&A adjuster and the seat tilt together (as in FIG. 1). However in accordance with another aspect of the invention, the seat, here designated 36' also can tilt with respect to the F&A adjuster. The entire seat and F&A adjuster are tilted upwardly in the clockwise direction by means of level adjuster 14 (FIG. 10. To compensate for the upward tilt of the adjuster, seat 36'is tilted down (counterclockwise) with respect to the F&A adjuster, so that it compensates for the upward and clockwise tilt of the adjuster and eat assembly. Note that the seat has the same forward tilt as in FIGS. 6A and 6B. The rider's position in FIG. 7A is exactly the same as in FIG. 6A: his leg extension or knee angle is optimized, as in FIG. 6A. The advantage of the tiltability of seat 36' has not yet come into play.

Figure 7B:
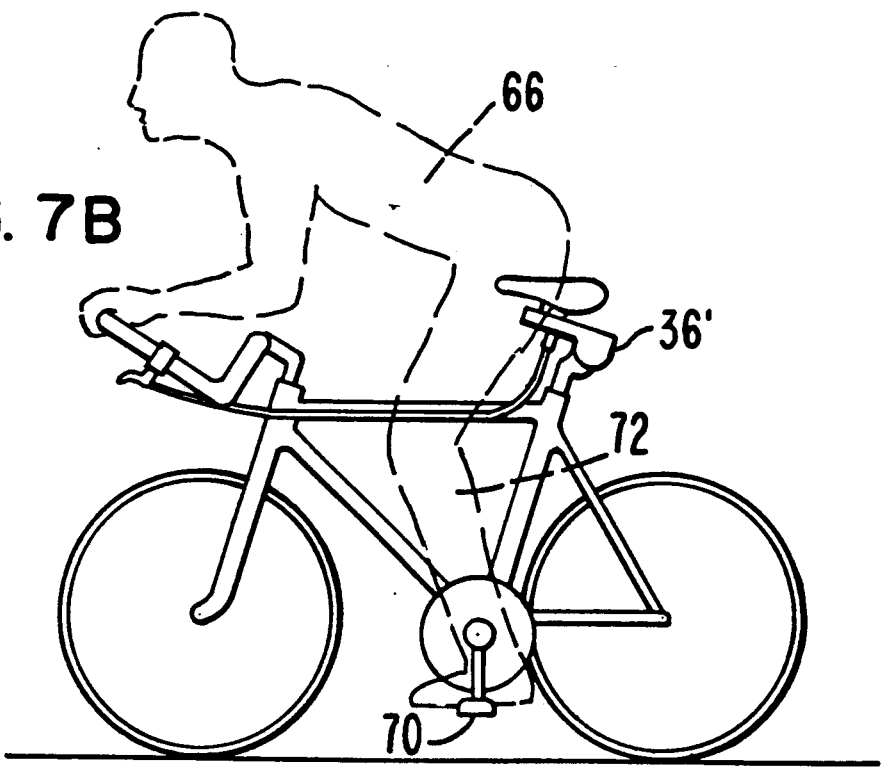
FIG. 7B is a diagram similar to FIG. 6B, but with the seat forward, and wherein the seat also tilts with respect to the F&A adjuster according to another embodiment.

FIG. 7B is a diagram similar to FIG. 6B. The F&A adjuster has been adjusted to move the seat and F&A assembly forward as in FIG. 6B. However since the F&A adjuster itself has been tilted up or clockwise, when it is adjusted to move the seat forward, the seat will move upwardly as well as forward. As a result, the rider has also moved upwardly, so that his net distance from the pedals will remain the same. Thus he will maintain the correct leg extension, despite being moved forward to a position which is more directly over the pedals.

Thus by making the seat and F&A assembly angularly adjustable with respect to the bicycle's frame, and by making the seat per se adjustable with respect to the F&A adjuster, we have enabled the rider to obtain the optimum leg extension no matter what the F&A position of the seat.

FIG. 8 is a side view of a seat assembly used in the embodiments of FIGS. 7A and 7B. The main difference in this embodiment is the provision of seat 36' which, as indicated, is angularly adjustable with respect to the F&A adjuster onto which it is mounted. Also this embodiment uses a slightly modified operating lever 50' and a F&A adjuster which uses an internal spring, rather than a bungee cord, to urge its inner member forwardly; these modifications are not dependent upon the angularly adjustable seat, but can also be used in the embodiment of FIGS. 1 to 5, and vice-versa.

In the F&A adjuster, inner member or tube 20' has a longitudinal slot 74 beginning at its front end and extending back about 1/3 the length of member 20. Outer member 16' includes a transverse pin 76 which extends across member 16', through slot 74. The rear end of member 20' has its own transverse pin 78 (FIG. 9A) and a coil spring is connected between pins 76 and 78 so as to urge inner member 20' forward. As before, the F&A adjuster with seat 36' attached, can pivot or tilt in a partial circle parallel to the plane of the paper about level adjuster 14.

FIG. 9A is a side sectional view of the seat assembly of FIG. 8, FIG. 9B is a sectional rear-facing view taken along the plane indicated by the line 9B—9B of FIG. 9A, and FIG. 9C is an exploded view of the seat adjusting parts of FIGS. (A and B). FIG. 9A shows the mechanism of level adjuster 14, which is conventional, and the detent locking mechanism including plunger 54, which is the same as that of FIGS. 1 to 5, except that the mechanism is bolted to outer member 16' by bolts 80, rather than a nut.

Seat 36' contains a seat angle adjustment mechanism comprising a threaded stud 82 whose lower end is threadedly attached to inner member 16' via slot 64 in outer member 16'. A nut 84 is threadedly attached to the top of stud 82. Below nut 84 is a mounting plate block 86 which is rectangular with rounded sides as shown in the exploded view of FIG. 9C. Bolt 82 passes through the hole in block 86. A pair of rectangular seat mounting plates 88U (upper) and 88L (lower) are positioned below block 86; stud 82 passes through holes in these plates also. As shown in FIG. 9C, plate 88L is rectangular with a convex top and plate 88U is rectangular with a concave top. The latter has an oblong hole for stud 82 and block 86 sits in its top concavity. These plates contain mating F&A grooves which sandwich portions of seat springs or rails 42 and thereby support seat 36'. Below plate 88L and mated with a recess therein is a saddle 90 which is rectangular in shape when seen from its top, which has a concave top, and which is bolted to inner member 20 by bolts 92.

To operate the seat adjuster, the rider first releases plunger 78 with lever 50' and then moves inner tube 20' of the F&A adjuster back in the manner previously described.

Next the rider adjusts the seat height with a conventional height adjustment mechanism (not shown). Then the rider adjusts the angle of the F&A adjuster with mechanism 14. The rider rotates the F&A adjuster clockwise (CW) slightly (when it is seen from the left side of the bicycle as shown) so that the F&A adjuster tilts upwardly slightly, as illustrated in FIGS. 7A and 7B. The angle of tilt should be such that when the rider moves inner tube 20' all the way forward, the seat will be at the same distance from the pedals so that the rider can maintain the same leg extension whether the seat is back or forward.

Then the rider adjusts the angle of seat 36' counterclockwise (CCW) with respect to the F&A adjuster and the bicycle so that the seat will have the desired tilt and will compensate for the upward, CW tilt of the F&A adjuster. The rider first loosens nut 84 by reaching under the seat with a suitable wrench. This releases or loosens block 86 and plates 88 with respect to saddle 90. Plates 88 can now be tilted or rotated in a F&A plane with respect to saddle 90 by manually rotating seat 36'. As stated, the seat is rotated CCW to compensate for the CW rotation of the F&A adjuster. After the rider adjusts seat 36' to the desired tilt, then he or she retightens nut 84, thereby clamping block 86 and plates 88 to saddle 90 again and fixing the seat angle.

The seat and F&A adjuster angles are now adjusted as shown in FIGS. 7. The height of the seat is adjusted for the rider's height to provide the correct leg extension or knee angle when the pedal is down. When the seat is back (FIG. 7A), the F&A adjuster will be tilted upwardly (CW), but the seat will be tilted downwardly (CCW) to compensate. When the seat is moved forward (FIG. 7B), due to the upward tilt of the F&A adjuster, the seat will be at the same distance from the pedals so that the rider's correct leg extension will be maintained. The seat angle will be maintained in the seat's forward position.

Thus by providing an angularly adjustable F&A adjuster and seat assembly, and by providing an angularly adjustable seat with respect to the F&A adjuster, we have provided a bicycle seating arrangement in which the rider can maintain the corect leg extension and seat angle regardless of the F&A position of the seat. Thus the rider can change the position of the seat to reduce fatigue, yet maintain maximum pedaling efficiency, put out optimum power, and suffer minimal fatigue.

SUMMARY, RAMIFICATIONS AND SCOPE

Accordingly, it is seen that we have provided a new and useful device for a bicycle which enables serious riders to maximize their efforts over long distances, during changes in road inclination, wind velocities, muscle fatigue, body positioning, etc., without the rider having to stop and use tools or operate levers, etc. This can be done even while the rider is pedaling at high speeds in i tense concentration.

While the above description contains many specificities, these should not be construed as limitations on the scope of the invention, but as exemplifications of the presently-preferred embodiment thereof. Many other ramifications and variations are possible within the teaching of the invention. For example, the seat positioning increments can be made shorter or longer, the overall range can be made shorter or longer, or the size, length or thickness o( the materials can be changed. The unit's forward and rearward movement can be controlled by a hydraulic mechanism, as can the seat-position locking. The resolution can be made infinite with hydraulics. The entire backward and forward seat position can be hydraulically controlled by a handlebar lever.

The unit can be made from aluminum, titanium, or any other suitable material. The mechanism can be used to adjust a seat in streamlined human-powered ground, water, or aircraft devices. Also, the plunger can be operated by a button on the outer tube. The bungee cord can be replaced with a spring. The telescopic tubes can be replaced with channels or slide bars.

Thus the scope of the invention should be determined by the appended claims and their legal equivalents, and not by the examples which have been given.

We claim:

1. A bicycle seat adjuster for a bicycle which is arranged to move in a predetermined forward motion direction and which has a frame and an elongated seat post having upper end and lower ends, said lower end being attached to and supported by said frame, said seat adjuster comprising:
    an outer tubular member having an extended length and a uniform bore along its length, said outer tubular member having a lower surface and an upper surface opposite to said lower surface,
    mounting means for mounting said outer tubular member on said upper end of said seat post such that said uniform bore is aligned generally with said predetermined forward motion direction and said lower surfaces said upper end of said elongated seat post,
    a slot of uniform width in said outer tubular member, said slot running longitudinally along said outer tubular member and parallel to said bore, said slot extending from said bore outwardly to the outside of said outer tubular member, said slot defining two facing and uniformly spaced slot walls, said slot being formed in said upper surface of said outer tubular member,
    an inner member having an outer surface sized to fit slidingly within said bore, said inner member being positioned within said bore, a slidable seat support member having two opposing faces spaced apart so as to fit slidingly within said two facing and uniformly spaced slot walls, said support member having lower and upper ends, attachment means for attaching said lower end of said seat support member to said inner member so that said seat support member extends generally normal to said inner member and so that said inner member and said seat support member are united for common sliding motion within a given range of adjustment with respect to said outer member, said seat support member extending through said slot in said upper surface of said outer tubular member and protruding upwardly from said upper surface of said outer tubular member, seat fastening means for fastening a bicycle seat to said upper end of said seat support member, locking means for locking said inner member to said outer member in a plurality of positions within said given range of adjustment, and urging means for continuously urging said seat support member in a given direction with respect to said outer tubular member, said given direction paralleling said predetermined forward motion direction, whereby a seat attached to said seat support member can be slidingly adjusted fore and aft with respect to said frame of said bicycle, yet will be prevented from side movement in with a simple, reliable mechanism.

2. The bicycle seat adjuster of claim 1 wherein said inner member has a plurality of holes therein, and further including (a) a detent plunger attached to said outer member and positioned to engage one of said holes, and (b) operating means for enabling a rider of a bicycle, when said adjuster is installed, to operate said detent plunger.

3. The bicycle seat adjuster of claim 2 wherein said operating means comprises an operating cable and an operating lever, one end of said cable connected to said detent plunger and an opposite end of said cable connected to said operating lever.

4. The bicycle seat adjuster of claim 2 wherein said inner member has a groove in said outer surface thereof, said groove interconnecting said plurality of holes.

5. The bicycle seat adjuster of claim 2 wherein said means for urging comprises a bungee cord.

6. The bicycle seat adjuster of claim 2 wherein said bore of said outer tubular member is circular.

7. The bicycle seat adjuster of claim 2 wherein said mounting means comprising a pivot by which one can adjust the angle of said outer tubular member, and hence said seat support member and any seat attached thereto, with respect to said bicycle frame, whereby any seat attached to said seat support member can be adjusted with respect to said bicycle frame in a fore-and-aft direction and said outer tubular member said seat can be adjusted in their angle of orientation with respect to said frame.

8. The bicycle seat adjuster of claim 2 wherein said two opposing faces of said seat support member are substantially flat and parallel.

9. The bicycle seat adjuster of claim 2 wherein said seat support member has a generally rectangular cross section and said two opposing faces thereof are substantially flat and parallel.

10. The bicycle seat adjuster of claim 2 wherein said mounting means is also arranged to enable the angle of said outer tubular member to be adjusted with respect to said seat post, and wherein said seat fastening means is arranged to enable the angle of said seat to be adjusted with respect to said slidable seat support member.

11. The bicycle seat adjuster of claim 1 wherein said means for locking comprises a plurality of holes in said inner member and controllable hole engagement means attached to said outer member.

12. A fore-and-aft adjuster for adjustably attaching a bicycle seat to a frame of a bicycle, said bicycle having a seat post with a lower end attached to said frame and an upper end, opposite to said lower end, said adjuster comprising:

a pair of telescoped tubes, said tubes comprising an outer tube of extended length having a uniform bore along its length and an inner tube having an outer surface which is dimensioned so that it can slide within said outer tube, said outer tube including a slot therein running parallel to said bore and longitudinally to said outer tube, said slot defining two facing and uniformly spaced parallel walls, said outer tube having an outer surface, said slot extending from said bore to said outer surface of said outer tube, mounting means for connecting said outer tube to said upper end of said seat post, and seat support means for connecting said bicycle seat to said inner tube, said seat support means comprising a slide member which extends through said slot in said outer tube and has a lower end which is connected to said inner tube so that has a lower end which is connected to said inner tube sos that said inner tube and said slide member are united for common sliding motion with respect to said outer tube, said slide member having an upper end which is connected to support said seat, said slide member having two opposing surfaces spaced apart so as to fit slidingly within said two facing and uniformly spaced walls of said slot, seat fastening means for fastening said bicycle seat to said upper end of said seat support member, whereby said seat can be adjusted in a fore-and-aft manner with respect to said bicycle, yet will be locked against rotation within said outer tube in an efficient, simple manner.

13. The fore-and-aft adjuster of claim 12, further including position control means for locking the position of said inner tube within any of a plurality of positions within said outer tube.

14. The fore-and-aft adjuster of claim 13 wherein said position control means comprises a plurality of holes in said inner tube and hole-engaging means connected to said outer tube for enabling said outer tube to be locked in a plurality of different, discrete positions to any selected one of said respective holes.

15. The fore-and-aft adjuster of claim 14 wherein said hole-engaging means comprises a cylinder attached to said outer tube and a spring-loaded plunger in said cylinder, said cylinder being mounted, shaped, and positioned so that said plunger projects therefrom and can engage one of said holes.

16. The fore-and-aft adjuster of claim 15, further including a remote control cable having one end attaching to said plunger and an opposite end attached to an operating lever.

17. The fore-and-aft adjuster of claim 14 wherein said inner tube has a groove in said outer surface thereof, said groove interconnecting said plurality of holes.

18. The fore-and-aft adjuster of claim 12, further including urging means for urging said inner tube in a predetermined direction within said outer tube.

19. The fore-and-aft adjuster of claim 12 wherein said bore in said outer tube is circular.

20. The fore-and-aft adjuster of claim 12 wherein said mounting means is also arranged to enable the angle of said outer tube to be adjusted with respect to said seat post, and wherein said seat fastening means is arranged to enable the angle of said seat to be adjusted with respect to said slide member.

21. A bicycle seat adjuster for a bicycle of the type arranged to move in a forward direction and having a frame and a seat post having lower end upper ends, said lower end connected to said frame, said adjuster comprising:

an outer tubular member of extended length having a uniform bore along its length, said outer tubular member having a lower surface and an upper surface opposite to said lower surface, pivot means for pivotably attaching said outer tubular member to said upper end of said seat post such that the angle of said outer tubular member can be pivoted, within a given range of rotation, about said upper end of said seat post, in a vertical plane which is parallel to said forward direction, a slot of uniform width in said outer tubular member, said slot running longitudinally of said outer tubular member and parallel to said bore, said slot extending from said bore outwardly to the outside of said outer tubular member, said slot defining two facing and uniformly spaced slot walls, said slot being formed in said upper surface of said outer tubular member, an inner member having an outer surface sized to fit slidingly within said bore, said inner member being positioned within said bore, a slidable seat support member having two opposing faces spaced apart so as to fit slidingly within said two facing and uniformly spaced slot walls, said seat support member having a lower end and an upper end, attachment means for attaching said lower end of said seat support member to said inner member so that said seat support member extends generally normal to said inner member and so that said inner member and said seat support member are united for common sliding motion within a given range of adjustment with respect to said outer member, said seat support member extending through said slot in said upper surface of said outer tubular member and protruding upwardly from said upper surface of said outer tubular member, seat pivot fastening means for pivotably fastening a bicycle seat to said upper end of said seat support member such that the angle of said seat can be pivoted, within a given range of rotation, about said upper end of said seat suport member, in a vertical plane which is parallel to said forward direction, whereby a seat attached to said seat support member can be slidingly adjusted fore and aft and in a range of angles with respect to said frame of said bicycle, yet will be prevented from side movement in with a simple, reliable mechanism, and a rider will be able to obtain optimum leg extension regardless of the fore-and-aft position of said seat.

22. The bicycle seat adjuster of claim 21 wherein said inner member has a plurality of holes therein, and further including (a) a detent plunger attached to said outer member and positioned to engage one of said holes, and (b) operating means for enabling a rider of a bicycle, when said adjuster is installed, to operate said detent plunger.

* * * * *

UNITED STATES PATENT AND TRADEMARK OFFICE
CERTIFICATE OF CORRECTION

PATENT NO. : 5,007,675

DATED : Apr. 16, 1991

INVENTOR(S) : M. S. Musto and S. W. Davis

It is certified that error appears in the above-identified patent and that said Letters Patent is hereby corrected as shown below:

Col. 4, line 56, change "backwards" to --backward--.

Col. 6, line 9, after "36'", insert --,--.

Col. 8, line 15, change "i tense" to --intense--.

Col. 8, line 24, change "o(" to --of--.

Col. 10, line 32, change "sos" to --so--.

Signed and Sealed this

Third Day of November, 1992

Attest:

DOUGLAS B. COMER

*Attesting Officer*   *Acting Commissioner of Patents and Trademarks*